United States Patent

[11] 3,607,091

[72] Inventor David M. Boyd
 Clarendon Hills, Ill.
[21] Appl. No. 880,654
[22] Filed Nov. 28, 1969
[45] Patented Sept. 21, 1971
[73] Assignee Universal Oil Products Company
 Des Plaines, Ill.
 Continuation-in-part of application Ser. No.
 759,104, Sept. 11, 1968.

[54] TEMPERATURE CONTROL SYSTEM FOR HYDROCARBON CONVERSION PROCESS
 14 Claims, 2 Drawing Figs.

[52] U.S. Cl. .................................................. 23/253,
 23/263, 23/288, 23/253 A, 208/59, 208/143,
 208/DIG. 1
[51] Int. Cl. ..................................................... B01j 9/04,
 C10g 13/00, C10g 37/02
[50] Field of Search ............................................ 23/230 A,
 253 A, 288 US, 230, 253 US; 196/132 US;
 235/151.12; 208/59, 108–111, 143, 209, 210, 213,
 216

[56] References Cited
 UNITED STATES PATENTS
2,909,413 10/1959 Hildyard ....................... 23/230
3,000,812 9/1961 Boyd, Jr. ....................... 208/DIG. 1
3,159,568 12/1964 Price et al. ..................... 208/213 X
3,250,757 5/1966 Smith et al. .................... 23/253 X
3,255,105 6/1966 Murray ......................... 208/DIG. 1
3,365,393 1/1968 Wooten ........................ 208/DIG. 1

Primary Examiner—Joseph Scovronek
Attorneys—James R. Hoatson and Philip T. Liggett ABSTRACT: In a hydrocarbon conversion process wherein a gaseous reactant and hydrocarbon to be converted, are reacted under conversion conditions, a control system for maintaining the level of conversion of the feed mixture at a level responsive to the availability of the gaseous reactant. Conversion severity is adjusted by temperature control on the feed mixture, reset by differential temperature control across the reaction zone. Unconverted product is recycled to the reaction zone from a lower section of a fractionation column, and a level control signal is sent therefrom to a selector relay which also receives a signal indicative of the pressure within the reaction zone. The selector relay develops an output signal which is a function of the pressure signal when the pressure is below a predetermined level, and which is a function of the level signal when the pressure is at or above the predetermined level. The selector output signal is sent to a summing relay which also receives a flow signal indicative of the flow of makeup reactant gas to the process of net gas product leaving the process. The summing relay then resets the differential temperature controller which in turn resets the temperature controller.

Figure 2

TEMPERATURE CONTROL SYSTEM FOR HYDROCARBON CONVERSION PROCESS

CROSS REFERENCE TO RELATED APPLICATION

This application is a continuation-in-part of my copending application, Ser. No. 759,104, filed on Sept. 11, 1968.

BACKGROUND OF THE INVENTION

This invention relates to a control system. It also relates to a control system for a chemical conversion operation. It specifically relates to a control system for regulating a hydrocracking reaction zone. It particularly relates to a method for controlling a process responsive to slow time factor variables.

In the chemical processing industry today there is a need for every increasing efficiency in the operation of process units. This increased efficiency has in a large measure been achieved through sophisticated instrumentation techniques. However, it has been found that in most processes there are a variety of slot time factor variables and fast time factor variables. In an effort to achieve stability of operation, the prior art has used a combination of these variables in an effort to achieve desired control of a given process. Basically, these time factor variables operate against one another. Almost without exception a given process is influenced to a greater degree by slow time factor variables. However, the delay time in attempting to operate with the slow time factor variables aggravates the control problem to such an extent that instability or "swinging" of the process unit is the result.

Accordingly, it would be desirable to develop a control system which utilizes a unique combination of slow time factor and fast time factor variables in order to achieve the desired stability of the process unit.

Recently, the petroleum industry has attempted to further upgrade the liquid product yield from a barrel of crude oil by improvements in the hydrocracking reaction. Basically, hydrocracking or destructive hydrogenation effects definite changes in the molecular structure of hydrocarbons. Hydrocracking, may, therefore, be designated as cracking under hydrogenation conditions in such a manner that the lower boiling hydrocarbon products resulting therefrom are substantially more saturated than when hydrogen is not present in the reaction zone.

As presently practiced, the hydrocracking reaction involves contacting a fluid mixture to be converted with a suitable catalyst in the presence of hydrogen. Since the reaction is basically one which separates large molecules into smaller molecules, it is essentially exothermic in nature. In addition, since the hydrocracking reaction has not yet been shown to be perfectly selective, there is produced from the reaction zone a large quantity of normally gaseous hydrocarbons as well as the desired normally liquid hydrocarbons which have been upgraded in quality. In addition, there is also produced a residue of unconverted heavier materials which are ultimately separated from the reaction zone effluent and preferably returned or recycled to the reaction zone for further conversion. In essence, it is the desire of most hydrocracking reactions to achieve a 100 percent conversion of the feed hydrocarbons into lighter and/or more valuable hydrocarbons. In other words, it is the preferred practice of the art of hydrocracking, to return the residual material entirely to the reaction, i.e. recycle to extinction.

While it is possible to design a hydrocracking process unit for 100 percent conversion of the feed hydrocarbons, it is not always possible to so operate the on-stream unit. Even when the hydrocracking unit is satisfactorily lined out with the heavy residual hydrocarbon being fully recycled to extinction, instances will often arise in which increasing reaction zone severity will be insufficient to maintain the level of conversion at 100 percent. Typically, this will occur when there is an insufficiency of hydrogen to react with the hydrocarbon. This condition may occur, for example, when the feed stock composition changes as the charge stock pumps are swung from one storage tank to another. If the charge stock of the new storage tank is a higher boiling range stock than the stock from the depleted storage tank, more hydrogen will typically be required to hydrocrack the heavier molecules to provide the desired conversion product. Or this condition may arise when the hydrogen supply is diminished due to an operational upset at the hydrogen source. For example, where a catalytic reforming unit provides the hydrogen supply for the hydrocracking unit, hydrogen supply will diminish with decreasing catalyst activity in the reforming unit, since the degree of dehydrogenation of naphthenes to produce aromatics and hydrogen will be diminishing. Notwithstanding the source of trouble, when the hydrogen supply is insufficient for the hydrocracking reaction to produce a 100 percent level of conversion, the amount of unconverted hydrocarbon recycled to the hydrocracking zone will increase. This increase will compound the difficulty since there is already an insufficient supply of hydrogen, and remedial action must therefore be taken to discontinue any attempt to recycle the unconverted hydrocarbon to extinction.

SUMMARY OF THE INVENTION

Accordingly, it is an object of this invention to provide a control system for a fluid mixture conversion process.

It is another object of this invention to provide a control system for a fluid mixture conversion process utilizing a combination of slow time factor variables and fast time factor variables.

It is a further object of this invention to provide an improved control system in a fluid mixture conversion process wherein a gaseous reactant and a feed fluid to be converted are reacted, and wherein the level of conversion is maintained at a level responsive to the availability of the gaseous reactant.

It is a particular object of this invention to provide an improved control system in a hydrocarbon conversion process wherein a gaseous reactant and a hydrocarbon to be converted are reacted, and wherein the level of conversion is maintained at a level responsive to the availability of the gaseous reactant.

It is a specific object of this invention to provide an improved control system for a hydrocracking reaction process which operates in a more facile and economical manner to optimize the degree of hydrocracking, consistent with the availability of the hydrogen reactant.

Accordingly, the present invention provides a control system for hydrocracking reaction zone wherein the level of conversion is controlled by temperature control on the reaction zone feed inlet which is reset by temperature differential control across the reaction zone. The effluent from the reaction zone is separated to provide at least a net gas product which is withdrawn from the process, and a liquid hydrocarbon phase which is passed to a fractionation column. Converted hydrocarbons are removed from an upper portion of the fractionation column while a liquid level of unconverted hydrocarbon is maintained in a lower portion of the column. The unconverted hydrocarbon is totally recycled to the reaction zone during normal periods of operational stability.

A level control signal is sent from the lower portion of the fractionation column to a selector relay which also receives a signal indicative of the pressure within the reaction zone. The pressure measurement in turn is indicative of the availability of hydrogen for the hydrocracking reaction. Since any deficiency in hydrogen supply will be indicated by a diminishing pressure within the reaction zone, the selector relay produces an output signal which is a function of the pressure signal when the pressure is below a predetermined level, and which is a function of the level signal when the pressure is at or above the predetermined level.

The selector output signal is fed to a summing relay which also receives a flow signal representative of the rate of flow of the makeup reactant hydrogen. Alternatively, the summing relay may receive a flow signal indicative of the flow off the net gas product leaving the process. The summing relay then resets the differential temperature controller which in turn resets the inlet temperature controller in a manner sufficient to maintain the temperature within the reaction zone at a level sufficient to optimize the degree of hydrocracking consistent to optimize the degree of hydrocracking consistent with the availability of the hydrocracking of the hydrogen reactant. Where the pressure of the reaction zone falls below the predetermined level, the inventive control system also provides a means for withdrawing from the process, unconverted hydrocarbon which is in excess of the amount which may be safely recycled to the reaction zone in view of the limited availability of hydrogen reactant.

Accordingly, a broad embodiment of the present invention provides, in a fluid mixture conversion process, wherein a fluid mixture, comprising gaseous reactant and a fluid to be converted, is introduced into a conversion zone maintained under conversion conditions; conversion zone effluent containing normally liquid and normally gaseous components is passed into a separation zone; normally gaseous components are removed from the separation zone; normally liquid components are passed from the separation zone into a fractionation column; conversion products are removed from the upper portion of the fractionation column; a level of unconverted liquid is maintained in the lower portion of said fractionation column; and said unconverted liquid is returned to the conversion of the fluid mixture at a level responsive to the availability of said gaseous reactant, which comprises: (a) a first means to establish a first signal functionally representative of the temperature of the fluid mixture, said first signal operatively connected to control means for heat input to said fluid mixture; (b) second means to establish a second signal representing the temperature differential of fluid into and out of said conversion zone, said second signal operatively connected to said first means to reset said first signal in a manner sufficient to maintain said differential temperature at a hereinafter specified value; (c) third means for establishing a third signal representative of the rate of flow of said normally gaseous components leaving the separation zone; (d) fourth means for establishing a fourth signal representative of said liquid level in the lower portion of the fractionation column; (e) fifth means for establishing a fifth signal representative of the pressure within said conversion zone; (f) sixth means receiving said fourth and fifth signals and developing a sixth signal which is a function of said fifth signal when said pressure is below a predetermined level and which is a function of said fourth signal when said pressure is at least at said predetermined level; and (g) seventh means for summing said third and sixth signals, thereby producing a seventh signal representative of the desired specified value of said differential temperature, said seventh signal operatively connected to said second means to reset the second signal.

A further broad embodiment of the present invention provides in a fluid mixture conversion process, wherein a fluid mixture, comprising gaseous reactant and a fluid to be converted, is introduced into a conversion zone maintained under conversion conditions; gaseous reactant is introduced into said process; conversion zone effluent containing normally liquid and normally gaseous components is passed into a separation zone; normally gaseous components are removed from the separation zone; normally liquid components are removed from the separation zone and passed into a column; conversion products are removed from the upper portion of the fractionation column; a level of unconverted liquid is maintained in the lower portion of the column; and said unconverted liquid is returned to the conversion zone; a control system for maintaining the level of conversion of the fluid mixture at a level responsive to the availability of said gaseous reactant, which comprises: (a) first means to establish a first signal functionally representative of the temperature of the fluid mixture said first signal operatively connected to control means for heat input to said fluid mixture; (b) second means to establish a second signal representing the temperature differential of fluid into and out of said conversion zone, said second signal operatively connected to said first means to reset and first signal in a manner sufficient to maintain said differentia temperature as at hereinafter specified value; (c) third means for establishing a third signal representative of the rate of flow of said gaseous reactant into said process; (d) fourth means for establishing a fourth signal representative of said liquid level in the lower portion of the fractionating column; (e) fifth means for establishing a fifth signal representative of the pressure within said conversion zone; (f) sixth means receiving said fourth and fifth signals an developing a sixth signal which is a function of said fifth signal when said pressure is below a predetermined level and which is a function of said fourth signal when said pressure is at least at said predetermined level; and, (g) seventh means for summing said third and sixth signals thereby producing a seventh signal representative of the desired value of said differential temperature, said seventh signal operatively connected to said second means to reset the second signal.

Preferred embodiments of this invention include the control systems broadly defined hereinabove, wherein said gas make flow rate and said gaseous reactant flow rate means consist of proportional-derivative control means.

Further preferred embodiments of this invention include these broadly defined control systems, wherein said conversion process is a hydrocarbon conversion process, and said fluid to be converted comprises hydrocarbon.

DETAILED DESCRIPTION OF THE INVENTION

Even though this invention will be described with reference to a hydrocracking reaction, it will be evident to those skilled in the art that it has broad application to conversion processes in general, which embody at least the following process variables: inlet temperature to the reaction zone, temperature change across the reaction zone, the production of normally gaseous components, and the utilization of a fractionating column to separate and recover desired conversion products. In addition, the invention has broad application to those processes which have the above mentioned variables plus a gaseous reactant as part of the feed to the conversion zone. Illustrative of other processes which may utilize the broad embodiments of this invention include catalytic reforming, catalytic cracking, ethylbenzene dehydrogenation to produce styrene, hydrodesulfurization, and the like.

Furthermore, the conversion zone, preferably, will contain catalytic compositions which influence or enhance the conversion reaction desired. In the practice of this invention the catalytic masses are desirably contained in fixed beds either as a single bed or as a plurality of fixed catalyst beds superimposed in a single vessel. If a plurality of catalyst beds are desirable, these may, of course, be contained in separate vessels which are typically in a series orientation. In the process referred to herein, the plurality of catalyst beds may vary from one to six, with the usual number of catalyst beds being three. Still further, the conversion reactions may either be endothermic or exothermic in nature. For the hydrocracking reaction, the exothermic nature of the reaction may demand the utilization of quench streams between catalyst beds in order to control the reaction at its desired level. Alternatively, for the endothermic reactions, the effluent between the intermediate catalyst beds may be reheated by any suitable means in order to maintain each catalyst bed at its proper conversion temperature.

As used herein, the term "level of conversion" is intended to embody the desired end result from subjecting a fluid mixture to the conversion system. For example, in the hydrocracking reaction, the level of conversion is desirably 100 percent, that is, the feed material is preferably 100 percent converted into lighter boiling products. Similarly, in the catalytic reforming operation, the level of conversion is denoted octane number relative to the feed hydrocarbons subjected to the platinum catalyst reaction zone. Also, as used herein, the term "gaseous reactant" is intended to include all those normally gaseous components which are at least in part consumed by the reaction mechanism. This, by its very nature, excludes the utilization of an inert diluent which is sometimes used in chemical processing for various reasons. Since it is an unusual chemical reaction which is 100 percent efficient with respect to the gaseous reactant, there will usually be in the effluent from the conversion zone, a significant portion of the gaseous reactants which have not been consumed. This unconverted portion of the gaseous reactant is normally separated and recycled to the reaction zone. Accordingly, as used herein, the term "gas make flow" or words of similar import are intended to exclude the recycle flow of unconsumed gaseous reactant which is present in the effluent from the conversion zone. Of course, in most of the processes referred to herein, the gaseous reactant comprises hydrogen.

As will become evident from the description presented herein, the various components of the control system are well known to those skilled in the art and from general knowledge. The various elements such as transducers, square root means, multipliers, controllers, accumulators, etc. are available commercially from any number of reputable manufacturers.

As previously mentioned, the present invention has specific application to the control of a hydrocracking reaction. Suitable charge stocks of hydrocracking processes are considered to include kerosene fractions, gas oil and white oil stocks, cycle stocks, fuel oil stocks, reduced crudes, the various high boiling bottoms recovered from the fractionating columns generally integrated within catalytic cracking operations and referred to as heavy recycle stocks, and other sources of hydrocarbons having a depreciated market demand due to the high boiling points of these hydrocarbons accompanied by the usual presence of asphaltic and other heavy hydrocarbonaceous residues. The present invention is particularly directed toward processing the heavier of the aforementioned feedstocks; that is, those heavy hydrocarbons having an initial boiling point of about 450° F. and an end boiling point of about 1,000° F. or more.

In general, the hydrocracking reaction utilizes a conventional hydrocracking catalyst which may be an iron group metallic component composited on a siliceous carrier material, such as alumina and silica. The hydrocracking catalyst may also comprise an iron group metallic component promoted by a Group VIA metal, such as molybdenum, chromium, and/or tungsten. Other hydrocracking catalysts known to those skilled in the art may also be satisfactorily used in the practice of this invention and, in particular satisfactory catalysts will include those which contain at least one metallic component selected from the metals of Groups VIA and VIII of the Periodic Table. The active metallic components are generally employed in an amount from about 0.01 percent to about 20.0 percent by weight of the total catalyst.

Operating conditions for the hydrocracking reaction include a temperature from 400° F. to 900° F., a pressure from 500 p.s.i.g. to 5,000 p.s.i.g., liquid hourly space velocity (V/V/hour) from 0.5 to 15, and hydrogen in an amount from 500 to 15,000 standard cubic feet of hydrogen per barrel of hydrocarbon.

The process conditions in the hydrocracking conversion zone are preferably adjusted so as to provide a 100 percent conversion of the feedstock to lighter boiling hydrocarbons, such as gasoline, per pass through the reaction zone. On the other hand, the level of conversion may be adjusted so as to provide from 30 percent to 70 percent conversion of the feedstock to gasoline or naphtha per pass. The design level of conversion will, of course, be consistent with the design availability of reactant hydrogen, and all commercial hydrocracking operations do not, therefore, recycle the unconverted hydrocarbon to extinction. Those skilled in the art of hydrocracking understand what is meant by the term "level of conversion" and use of the term herein embodies conventional definition.

The invention may be more fully understood with reference to the accompanying drawings which illustrate in.

DESCRIPTION OF THE DRAWINGS

Figure 1:
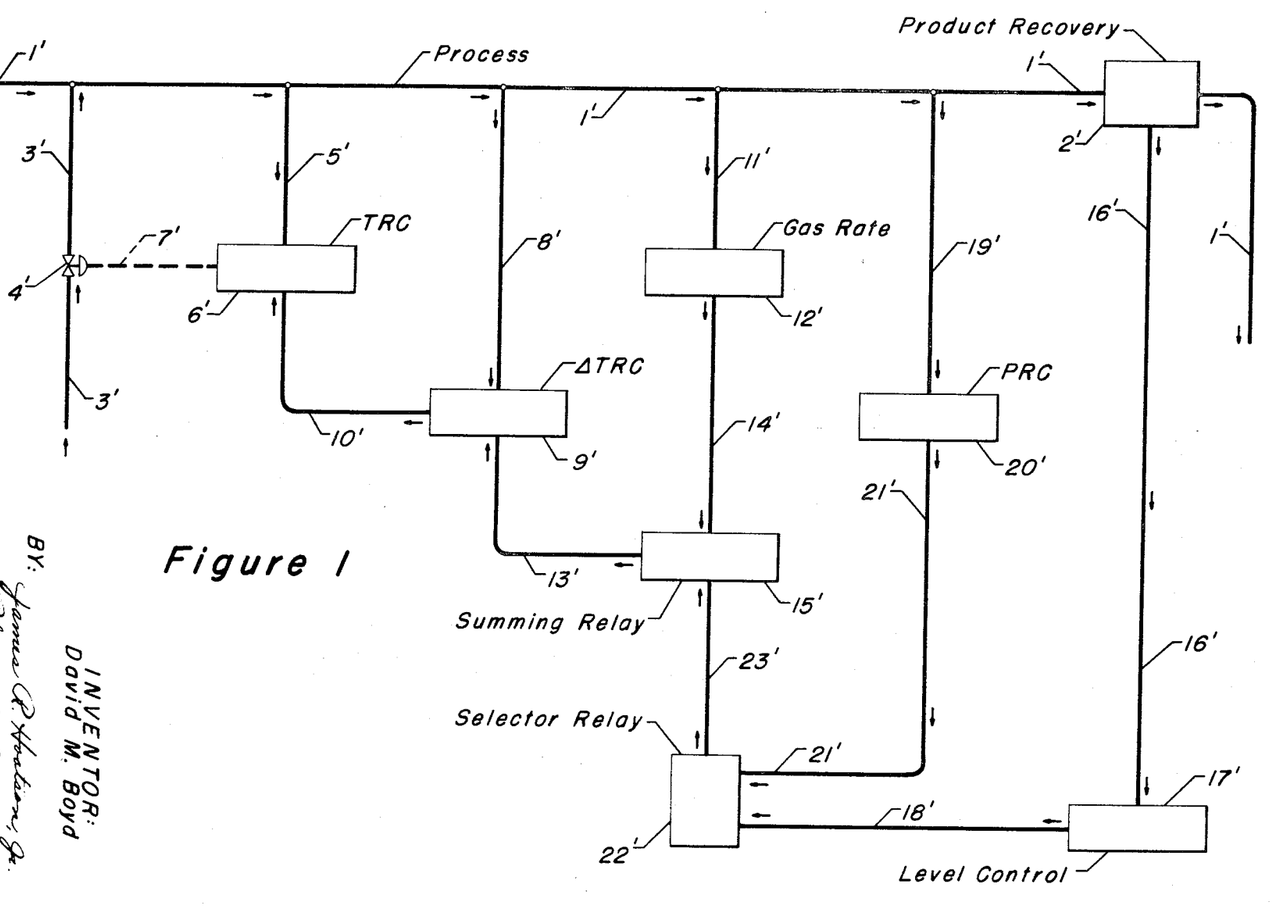
FIG. 1 a schematic representation of a general conversion process and the inventive method of control.

Referring now to FIG. 1, line 1' is a schematic representation of a conversion process in which a fluid mixture, comprising a gaseous reactant and a fluid to be converted, is converted by a sequence of operations illustrated by the various points along line 1', resulting in a conversion product being collected in zone 2'. Line 3' contains a means for varying a condition, such as the fuel input to a fired furnace, which supplies heat to the fluid mixture in line 1'. This means comprises a valve or other means 4' which controls the extent to which the heat input control means is being employed.

Line 5' carries a determination of the temperature of the fluid mixture being introduced into the conversion zone to temperature recorder controller (TRC) 6' which acts responsive to the temperature condition through line 7' on valve 4' thereby maintaining the temperature at the set point to which TRC 6' is set.

Line 8' is a later stage in the process and transmits a determination of the temperature differential across the reaction or conversion zone into the delta temperature recorder controller (ΔTRC) 9'. The ΔTRC determination is a longer time factor variable than the variable controlled by TRC 6'. ΔTRC 9' receives its signal via line 8' and attempts to maintain the temperature differential at the differential temperature set point by acting through means 10' upon TRC 6' to change the TRC set point so that the temperature sought to be established, is established at a level more consistent with the desired temperature differential across the conversion zone.

In accordance with one embodiment of this invention, line 11' carries a determination of the flow rate of the normally gaseous component which has been separated from the effluent of the conversion zone. The normally gaseous component of the effluent is typically discharged as a net gas product of the conversion process. This flow rate is transmitted into flow controller 12' which, in accordance with the practice of this invention, must be a proportional-derivative control means; that is, it is essential that controller 12' not contain the integral function normally associated with flow rate controllers.

The product recovery zone 2' includes a fractionating column containing a level of unconverted material sensed by line 16'. The level of unconverted material is maintained in the lower portion of the fractionating column which separates the conversion process liquid into a product fraction and into a fraction comprising unconverted material to be recycled to the conversion zone. This level determination is passed via line 16' into level control means 17' which thereby produces an output signal representative of the level of such material. The level signal is transmitted via line 18' as one input signal to a selector relay 22'. The other input signal to selector relay 22' is a pressure signal which will be discussed more fully hereinafter. Under normal on-stream conditions when the conversion process is supplied with a sufficiency of gaseous reactant, the selector relay 22' will transmit an output signal 23' which is a function of the level signal 18'.

The selector output signal passes via line 23' into a summing relay 15', which also receives a second signal. The second signal received by summing amplifier or relay 15' is the signal generated by flow control means 12', such signal being transmitted from controller 12' via line 14' into amplifier 15'.

Summing amplifier 15' performs the algebraic additive function on the signals in line 14' and 18', thereby producing an output signal which is representative of the desired temperature differential which is to be maintained across the conversion zone. The output signal is transmitted via line 13' to ΔTRC 9' to change its set point so that the TRC condition it seeks to establish, is established at a level more consistent with the temperature differential demanded by the output signal 13′ from summing relay 15′. In cascade fashion the change in ΔTRC 9′ produces a change in TRC 6′ which activates an appropriate change in heat input control means represented by valve 4′ in line 3′.

Alternatively, the above control system will operate satisfactorily by including in flow controller 12′ a determination of the flow of a gaseous reactant makeup stream passing into line 1′ prior to the conversion zone. It is important to note that the makeup gaseous reactant flow determination is in lieu of the discharged gas product or gas make flow determination. The other functions of the various components remain substantially the same.

It is to be noted that the level of conversion for the conversion system is basically determined by the amount of unconverted material which is accumulated in the lower portion of the product recovery fractionating column. However, the use of level controller 17′ alone is not satisfactory since the time delay between the transmission of a signal from level control means 17′ to heat input means at line 3′, is too long to effectuate stable control of the process. It should also be noted that the utilization of gas rate controller 12′ in either of the described embodiments is also not satisfactory when utilized alone. For example, the gas make composition may change, particularly with respect to its gravity, and this kind of change would automatically change its flow indication thereby giving an untrue indication that something needed adjusting in the conversion zone. Furthermore, the feed composition may change which would result in a distinct change in both the gas product and in the gaseous reactant demand. Therefore, the process cannot be satisfactorily stabilized by relying on either one of these gas flow rates alone.

Therefore, one aspect of the present invention is embodied in the discovery that stability of the process could be achieved by combining a slow time factor variable, such as level control, with an intermediate time factor variable, such as gas flow rate, to reset the fast time flow control variable which is the conversion zone inlet temperature.

During periods of stabilized operation when sufficient gaseous reactant is available to supply all of the chemical needs of the conversion process, the level controller 17′ will transmit a signal which is representative of the level of unconverted liquid in the fractionation column. As the level rises, the output signal 18′ passing via selector relay 22′ and signal line 23′ to summing relay 15′, will produce a demand for a higher level of conversion in the conversion process in order to bring the level back down to the control point. However, if temperature conditions within the conversion process are such that an excess amount of conversion is already occurring, this excess rate of conversion will be reflected by a high flow rate for the gas product as sensed by FRC 12′. Similarly, a high level of conversion will be indicated by a high flow rate of gaseous reactant passing into the process. Sensing a high conversion level by either of these gas flow rates, FRC 12′ sends a flow rate signal to summing relay 15′ via line 14′, calling for a decrease in the level of conversion. Thus, summing relay 15′ senses a competing demand in that level controller 17′ calls for a higher level of conversion, while gas flow controller 12′ calls for a reduction in the level of conversion. Summing relay 15′, then, algebraically combines the level signal and the gas flow signal to produce an output signal 12′ which is an optimum compromise between the competing demands of the level and flow signals.

Alternately, level controller 17′ may sense that the liquid level of unconverted material is dropping in the fractionation column. Output signal 18′ will then call for a reduction in the level of conversion within the conversion process in order to reestablish the liquid level at the control point. Similarly, however, flow controller 12′ may sense that the gas flow is lower than the design flow rate and may call for an increase in the level of conversion in order to reestablish the gas flow rate at the desired set point. Summing relay 15′ then will algebraically add the level control signal passing via line 18′, relay 22′, and line 23′, with the flow signal passing via line 14′ to produce an output signal 13′ which is a resulting function of the summation of the competing signals. Signal 13′ then resets temperature controllers 9′ and 6′ in cascade sequence to adjust the conversion conditions to the optimum level.

However, those skilled in the art will realize that the flow signal may not truly be indicative of the level of conversion if there is a change in the pressure within the system. Thus, by the practice of the present invention, there is provided in the conversion process a means 20′ for sensing the pressure within the conversion zone. If the supply of gaseous reactant is not sufficient to maintain the level of conversion consistent with the demand provided by output signal 13′, this insufficiency will be reflected by a gradual drop in the pressure of the system. Thus, there is provided a pressure sensing line 19′ passing to the pressure controller 20′. Controller 20′ transmits a pressure signal via line 21′ to selector relay 22′. When the pressure within the process falls below a predetermined level, selector relay 22′ cuts out the level signal 18′ and transmits the pressure signal 21′ to the summing relay 15′ via line 23′. The summing relay 15′, sensing that the pressure signal calls for a reduction in the level of conversion within the process, will combine the pressure signal with the flow signal 14′ to produce an output signal 13′ which will readjust the level of conversion within the conversion process to a rate of conversion consistent with the availability of the gaseous reactant. Signal 13′ then will reset ΔTRC 9′ which in turn will reset TRC 6′ to adjust the heat input to the conversion process in order to maintain the rate of conversion consistent with the availability of the gaseous reactant.

Figure 2:
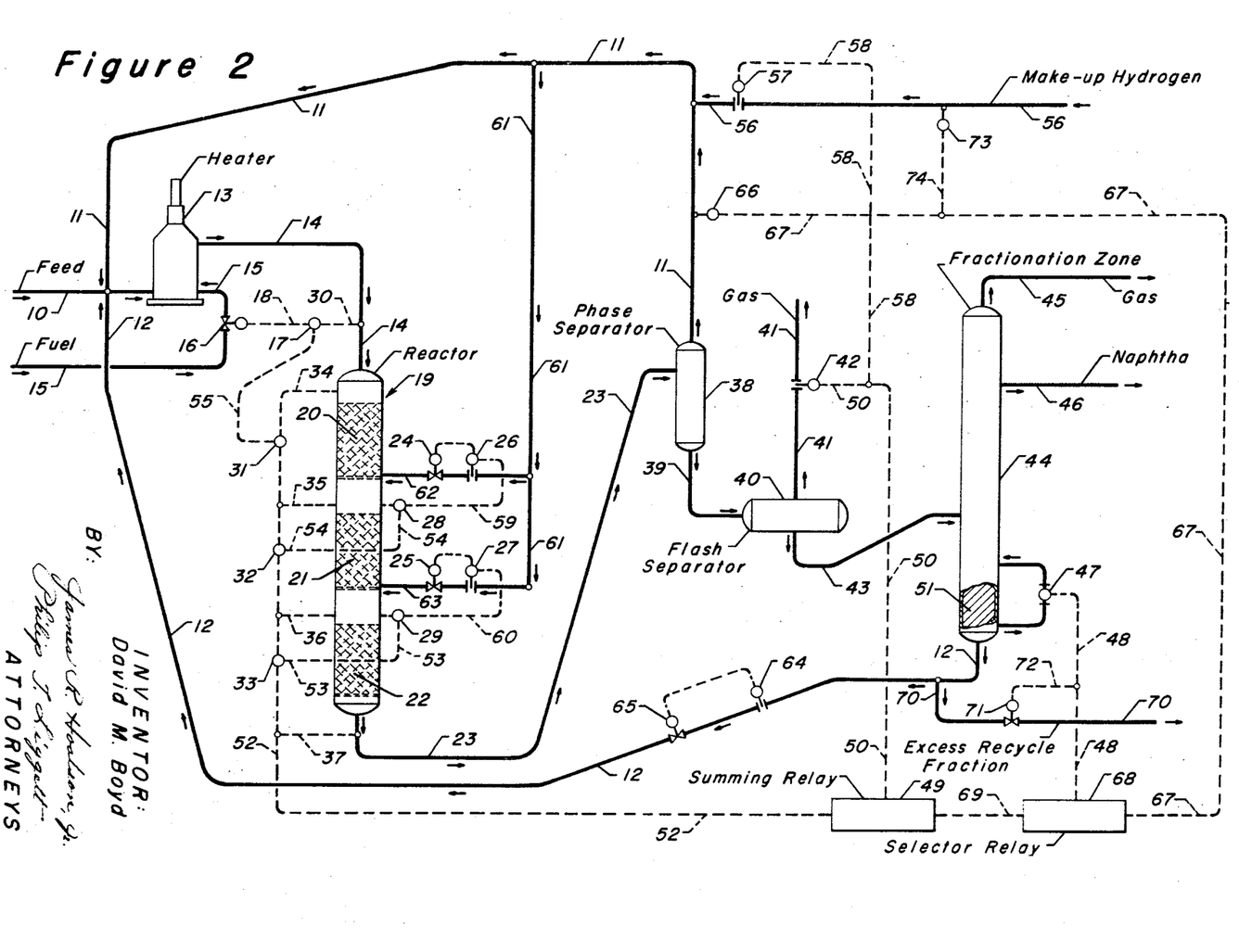
FIG. 2 the specific application of this invention to the hydrocracking of gas oil stocks to produce an upgraded naphtha material.

The method of operation of the inventive control system may now be more readily understood by referring to FIG. 2 which provides a simplified schematic flow diagram of a typical hydrocracking reaction system, wherein it is desired to recycle the unconverted hydrocarbon to extinction.

Referring now to FIG. 2, a suitable hydrocarbon feedstock to be converted, such as a gas oil fraction boiling between about 470° F. and 900° F. is introduced into the system via line 10. A gaseous reactant comprising hydrogen is also admixed with the feed stream by introduction into line 10 from line 11. Still further, a recycle hydrocarbon fraction comprising hereinafter specified unconverted material is also admixed with the feed stream by introduction into line 10 from line 12. This total feed mixture passes through heater 13 and thereafter into reactor 19 via line 14. For purposes of illustration, reactor 19 contains catalyst beds 20, 21, and 22 of the type referred to hereinabove.

Heater 13 is operationally controlled by the flow of fuel passing through line 15 and flow control valve 16. The inlet temperature to reactor 19 is measured by TRC 17 which is connected to a thermocouple or other sensing means 20, and which controls valve 16 via transmission means 18.

In addition, there is placed across catalyst beds 20, 21, and 22, ΔTRC 31, 32, and 33, respectively. ΔTRC 31 senses the temperature across catalyst bed 20 by means of thermocouple circuits 34 and 35. The output signal of ΔTRC 31 is sent to TRC 17 via lead 55 in order to reset the automatically adjustable set point of TRC 17. In addition, hydrogen gas is utilized as a thermal quench between each catalyst bed and is introduced into the reactor 19 via lines 61, 62, and 63. The amount of quench gas is controlled by flow controller 26 which activates flow control valve 24 in line 62, and by flow controller 27 which activates control valve 25 in line 63. Flow controller 26 is set by an output signal from TRC 28, which signal is an indication of the temperature of the effluent leaving catalyst bed 20. This control is achieved by the connecting lead 59 passing from temperature controller 28 to flow controller 26. Similarly, the flow controller 27 is set by an output signal from TRC 29 which senses the temperature of the effluent leaving catalyst bed 21. This latter control is achieved by connecting lead 60 passing from temperature controller 29 to flow controller 27.

To achieve the control stability of the present invention it is to be noted that ΔTRC 32 resets TRC 28 via connecting lead 54. In similar manner, ΔTRC 33 resets TRC 29 via connecting lead 53. ΔTRC 32 senses the temperature across bed 21 by means of thermocouple means 35 and 36, while ΔTRC 33 senses the temperature across bed 22 by means of thermocouple means 36 and 37.

Thus, by operating in this manner, the temperature differential across each catalyst bed is maintained at a hereinafter described predetermined differential temperature level.

Referring again to the process flow, the total effluent from reactor 19 is withdrawn via line 23 and passed into a phase separation zone 38 which is maintained under conditions sufficient to separate the unconverted hydrogen gas from the liquid constituents of the effluent. The unconverted hydrogen is returned to the conversion zone via line 11 utilizing, compressor means, not shown. Makeup hydrogen, as needed, is introduced into the system via line 56 which has flow controller 57 appropriately placed in the conduit. The remainder of the effluent stream which has been separated in phase separator 38, and which comprises normally gaseous hydrocarbons dissolved in the normally liquid hydrocarbons, is passed via line 39 into flash separator 40.

Flash zone 40 is maintained under conditions sufficient to flash off normally gaseous hydrocarbons such as methane, ethane, and propane. It is preferred that no substantial amount of butane be flashed off in separator 40, and the amount of pressure reduction in passing from zone 38 to zone 40 is controlled to this end. The amount of this gas is sensed by flow controller 42 in conduit 41, which provides means for withdrawing the net gas product from the process.

The remaining portion of the effluent which now comprises primarily normally liquid hydrocarbons, but which may contain a significant amount of $C_4$ hydrocarbons, is withdrawn via line 43. If desired, the material may be passed into a conventional debutanizer column for the separation and recover of $C_4$ hydrocarbons (not shown). The product recovery column is shown as column 44 and takes as its feed the material from flash zone 40 via line 43. The desired converted hydrocarbon fraction, such as naphtha, is removed via line 46 and/or normally gaseous hydrocarbons are removed via line 45. Thus, the converted products are removed as distillate streams from an upper portion of fractionation zone 44. A level of unconverted hydrocarbons is maintained in the lower portion or bottom of fractionation zone 44 and is designated as point 51. Level control means 47 is utilized to sense and determine the level of unconverted material present in column 44. In the preferred embodiment of the invention the unconverted hydrocarbons are withdrawn from column 44 and passed via line 12 as the specified recycle fraction passing into line 10 in the manner previously described. Typically, there is provided in line 12, a flow control loop comprising a control valve 65 receiving a flow control signal from FRC 64. This flow control loop is provided to control the flow of recycle liquid to the reactor 19 via line 12 at a flow rate designed to maintain the space velocity within the conversion zone.

Turning now to the inventive control system of this invention, it is to be noted that the signal generated by flow controller 42 is passed via line 50 into summing relay 49. Similarly, during stable operation the signal generated by level control means 47 is passed via lead 48 into summing relay 49 by way of selector relay 68 and line 69. Summing relay 49 combines the signals 69 and 50, and produces and output signal which is passed via line 52 into ΔTRC's 31, 32, and 33, respectively.

Alternatively, the signal generated by flow controller 57 which is representative of the makeup hydrogen flow rate is passed via line 58 and 50 into summing relay 49. In such event, no signal is used from flow controller 42.

In any event, it is to be noted that the output signal from summing relay 49 is representative of the desired differential temperature which is to be maintained across the respective catalyst beds. This signal then resets the control set point of each differential temperature controller 31, 32, and 33, which in turn resets the temperature controllers 17, 28, and 29 in order to increase each bed inlet temperature.

In normal operation, therefore, if the level in the bottom of fractionating column 44 begins to increase, the signal from controller 47 will demand the severity of the hydrocracking reaction be increased. Complementing this signal for increased severity is, in one embodiment, the amount of gas which is produced from this increased severity, represented by the signal generated from flow controller 42. Therefore, the combined signals from controller 42 and controller 47 result in a signal 52 which is, in effect, a compromise on the demands for increased severity. The compromised demand for increased severity is ultimately represented by a demand for increased differential temperature across each catalyst bed, which in turn is achieved by raising the inlet temperatures to each catalyst bed as sensed and controlled by TRC's 17, 28 and 29, respectively.

Should the level of unconverted material in column 44 begin to decline, the reverse effect would take place, thereby calling for a reduction in the severity of reaction.

In other words, as an example, assume that level controller 47 produced an output signal representing that conversion level should be increased by a 4° F. greater differential temperature in order to properly maintain the level in column 44. Controller 47 would then send this signal to the differential temperature instruments 31, 32, and 33, which would increase appropriately the differential temperature across the catalyst beds. However, in a short length of time the rate of flow of gas product leaving the process via line 41, or the hydrogen makeup rate of flow in line 56 would significantly increase. The signal generated by controller 42 representing this flow increase or, alternatively, the signal generated by controller 57, would demand that the system modify the 4° F. ΔT originally desired by controller 47 to, for example a 2° F. ΔT. In due time, the level in column 44 would stabilize to such an extent that level controller 47 would be satisfied by only a 2° F. increase in ΔT.

However, the compromised demand for conversion level which results in a demand for an increase in ΔT of only 2° F. may raise the level of conversion to such an excessive degree that the supply of makeup hydrogen becomes insufficient to maintain the level of conversion. Or, as pointed out hereinabove, an operational upset at the hydrogen source may result in an insufficient supply of hydrogen for the hydrocracking process. In order to provide for such a condition of operational instability, there is provided in the inventive control system, means for sensing the pressure within the hydrocracking reaction zone.

Referring again to FIG. 2 there is shown a pressure sensing means 66, which may be provided in line 11 as shown, or in phase separator 38, or in any vapor or gas phase location within the process such as line 61, 62, or 63. Pressure sensing means 66 transmits a signal via line 67 which is indicative of the pressure within the reaction zone, and this signal is received by selector relay 68.

When the supply of hydrogen available for reaction is insufficient to maintain the level of conversion in the hydrocracking reaction zone, the pressure within the conversion or reaction zone will gradually decline as hydrogen is chemically consumed within the system. Signal 67 thereby will act upon selector relay 68 to cut out or override the level control signal 48 when the pressure within the reaction zone falls to a predetermined level. At this point, selector relay 68 will transmit a signal via line 69 to the summing relay 49, which is a function of the pressure control signal 67 rather than the level controller signal 48. At this point then, the summing relay 49 will produce an output signal 52 which is representative of the flow control signal 50, and of the pressure control signal 67 transmitted via selector relay 68 and line 69. Thus the resulting output signal 52 will reset the control points of ΔTRC 31, 32, and 33 in a manner sufficient to reduce the temperature level within the catalyst beds 20, 21, and 22. The reduction in temperature level will, of course, produce a decrease in the level of conversion of hydrocarbons passing through the reaction zone, thereby reducing the rate of hydrogen consumption and reestablishing the reaction zone pressure at the proper level.

Decreasing the hydrogen consumption and level of conversion, produces an accumulation of unconverted hydrocarbon liquid in the bottom of fractionator 44. Since the flow of recycle hydrocarbon fraction via line 12 is maintained constant by means of the controller 64 and valve 65, provision must be made to withdraw the excess unconverted hydrocarbon. Accordingly, there is provided a withdrawal line 70 by means of which excess unconverted hydrocarbons may be removed from line 12 and the hydrocracking process. The withdrawal rate of the excess recycle fractionation via line 70 is controlled by a control valve 71 which remains closed during stable periods of operation when the hydrocracking unit is otherwise operating at a 100 percent level of conversion. However, when the hydrogen supply is insufficient to hydrocrack the hydrocarbons to extinction as desired, the selector relay 68, having cut off the output signal 48 of the level controller 47 from the summing relay 49, has thereby caused the output signal 48 to increase in its demand for an increase in the level of conversion. Accordingly, the flow control valve 71 is provided with a split range mechanism so that when the selector relay 68 develops an output signal 69 which is a function of the pressure, the level control signal is thereafter passed via transmitting means 48 and 72 to the control valve 71. At this point, control valve 71 opens and is controlled by the level controller 47 in a manner sufficient to maintain a constant level in the bottom or lower section of fractionator 44. For example, level controller 47 may typically develop a pneumatic output signal in the range of from 3 p.s.i.g. to 15 p.s.i.g. Valve 71 will contain a split-range device holding the valve closed whenever the level signal passes to the valve 71 and the selector relay 68 at an air pressure in the range of from 3 to 12 p.s.i.g. However, when the selector relay 68 begins to produce its output signal 69 as a function of the pressure signal 67, the air signal passes to control valve 71 and selector relay 68 at an increasing pressure, and when the air signal is in the range of from 12 to 15 p.s.i.g., valve 71 will open to discharge excess recycle fraction via line 70 in response to the output signal 48 and 72 from level controller 47.

As an alternative to sensing a diminishing supply of makeup hydrogen by a decreasing pressure within the reaction zone as sensed by pressure sensing means 66, there may be provided instead a pressure sensing means 73 in the makeup hydrogen line 56. In such an embodiment then, the pressure signal would pass via line 74 and line 67 to the selector relay 68, and the output signal from pressure sensing means 66 would be disconnected from the system.

In either event, those skilled in the art realize that either pressure sensing means 66 or pressure sensing means 73 produce a signal which is representative of the pressure within the reaction zone. Accordingly, the inventive control system senses the availability of the gaseous reactant, or makeup hydrogen, and resets or overrides the control system which adjusts the level of conversion with the reaction zone. Thus the system, as disclosed hereinabove, provides a means for maintaining the level of conversion of the hydrocarbon feed stock at 100 percent conversion, or at any other level desired, by adjusting conversion severity responsive to the level control signal and to a flow control signal during periods of stable operation when sufficient hydrogen is available. Yet the system will respond to the availability of the makeup hydrogen in that when insufficient hydrogen is available, the selector relay readjusts the conversion level responsive to the availability of the hydrogen gas reactant.

PREFERRED EMBODIMENTS

The advantages of the inventive control system will be readily apparent to those skilled in the art from the foregoing disclosure.

While the discussion has been directed to a hydrocracking operation wherein the hydrocarbon is recycled to extinction, the control system is readily adaptable to a process wherein some intermediate level of conversion below 100 percent is the desired level for stable operation, and those skilled in the art will readily ascertain the method of operation for the inventive control system at any desired level of conversion utilizing the teachings disclosed hereinabove.

It may thus be summarized, that a preferred embodiment of the present invention provides in a hydrocarbon conversion process wherein a hydrocarbon to be converted is admixed with a gaseous reactant and a hereinafter specified recycle hydrocarbon to produce a conversion zone feed mixture; said feed mixture is passed at conversion temperature through a first conduit into a conversion zone comprising a plurality of fixed catalyst beds in series; the effluent from each catalyst bed preceding the last bed is contacted with additional gaseous reactant being introduced through a second conduit associated with each bed succeeding the first catalyst bed; the conversion zone effluent is removed from the last catalyst bed and separated in a separation zone to provide at least a normally liquid hydrocarbon fraction and a normally gaseous product fraction; the normally gaseous product fraction is withdrawn from the separation zone via a third conduit; the normally liquid hydrocarbon fraction is withdrawn from the separation zone and passed into a fractionation column; converted hydrocarbon products are removed from the upper portion of the fractionation column; a level of unconverted hydrocarbon is maintained in the lower portion of the column; the unconverted hydrocarbon is returned to the conversion zone as said recycle hydrocarbon specified; and, makeup gaseous reactant is passed into the process via a fourth conduit; a control system for maintaining the level of hydrocarbon conversion at a level responsive to the availability of said gaseous reactant, which comprises: (a) first means to establish a first signal functionally representative of the temperature of the feed mixture, said first signal operatively connected to control means for heat input to said feed mixture; (b) second means to establish a second signal representing the temperature differential of fluid passing into and out of the first bed of said plurality of catalyst beds, said second signal operatively connected to said first means to reset said first signal in a manner sufficient to maintain the temperature differential across said first bed at a hereinafter specified value; (c) third means associated with each catalyst bed succeeding said first bed, to establish a third signal representing the temperature differential of fluids passing into and out of the associated succeeding catalyst bed in said plurality of beds, each third signal being operatively connected to fourth means hereinafter specified; (d) fourth means associated with each succeeding catalyst bed, controlling the rate of flow of additional gaseous reactant in the correspondingly associated second conduit, said fourth means being operatively responsive to the associated third signal in a manner sufficient to adjust said rate of flow to maintain the temperature differential across the associated succeeding catalyst bed at a hereinafter specified value; (e) fifth means to establish a fifth signal representative of the rate of flow of said makeup gaseous reactant; (f) sixth means for establishing a sixth signal representing said liquid level in the lower portion of the fractionating column; (g) seventh means for establishing a seventh signal representative of the pressure within said conversion zone; (h) eighth means receiving said sixth and seventh signals and developing an eighth signal which is a function of said seventh signal when said pressure is below a predetermined level and which is a function of said sixth signal when said pressure is at least at said predetermined level; (i) ninth means for summing said fifth and eighth signals, thereby producing a ninth signal representative of the desired specified value of each differential temperature; and, (j) tenth means transmitting said ninth signal to said second means to reset said second signal, and to said third means to reset each third signal.

It may further be summarized, that another preferred embodiment of the present invention provides in a hydrocarbon conversion process wherein a hydrocarbon to be converted is admixed with a gaseous reactant and a hereinafter specified recycle hydrocarbon to produce a conversion zone feed mixture; said feed mixture is passed at conversion temperature through a first conduit into a conversion zone comprising a plurality of fixed catalyst beds in series; the effluent from each catalyst bed preceding the last bed is contacted with additional gaseous reactant being introduced through a second conduit associated with each bed succeeding the first catalyst bed; the conversion zone effluent is removed from the last catalyst bed and separated in a separation zone to provide at least a normally liquid hydrocarbon fraction and a normally gaseous product fraction; the normally gaseous product fraction is withdrawn from the separation zone via a third conduit; the normally liquid hydrocarbon fraction is withdrawn from the separation zone and passed into a fractionation column; converted hydrocarbon products are removed from the upper portion of the fractionation column; a level of unconverted hydrocarbon is maintained in the lower portion of the column; the unconverted hydrocarbon is returned to the conversion zone as said recycle hydrocarbon specified; and, makeup gaseous reactant is passed into the process via a fourth conduit; a control system for maintaining the level of hydrocarbon conversion at a level responsive to the availability of said gaseous reactant, which comprises: (a) first means to establish a first signal functionally representative of the temperature of the feed mixture, said first signal operatively connected to control means for heat input to said feed mixture; (b) second means to establish a second signal representing the temperature differential of fluid passing into and out of the first bed of said plurality of catalyst beds, said second signal operatively connected to said first means to reset said first signal in a manner sufficient to maintain the temperature differential across said first bed at a hereinafter specified value; (c) third means associated with each catalyst bed succeeding said first bed, to establish a third signal representing the temperature differential of fluids passing into and out of the associated succeeding catalyst bed in said plurality of beds, each third signal being operatively connected to fourth means hereinafter specified; (d) fourth means associated with each succeeding catalyst bed, controlling the rate of flow of additional gaseous reactant in the correspondingly associated second conduit, said fourth means being operatively responsive to the associated third signal in a manner sufficient to adjust said rate of flow to maintain the temperature differential across the associated succeeding catalyst bed at a hereinafter specified value; (e) fifth means to establish a fifth signal representative of the rate of flow of said normally gaseous product fraction; (f) sixth means for establishing a sixth signal representing said liquid level in the lower portion of the fractionating column; (g) seventh means for establishing a seventh signal representative of the pressure within said conversion zone; (h) eighth means receiving said sixth and seventh signals and developing an eighth signal which is a function of said seventh signal when said pressure is below a predetermined level and which is a function of said sixth signal when said pressure is at least at said predetermined level; (i) ninth means for summing said fifth and eighth signals, thereby producing a ninth signal representative of the desired specified value of each differential temperature; and, (j) tenth means transmitting said ninth signal to said second means to reset said second signal, and to said third means to reset each third signal.

Additionally, more particularly preferred embodiments of the present invention comprise these two preferred embodiments wherein there is provided eleventh means for withdrawing unconverted hydrocarbon from said hydrocarbon conversion process, and said eleventh means is operatively responsive to said sixth signal when said eighth signal is a function of said seventh signal.

The invention claimed:
1. In a fluid mixture conversion process, wherein a fluid mixture, comprising gaseous reactant and a fluid to be converted, is introduced into a conversion zone maintained under conversion conditions; conversion zone effluent containing normally liquid and normally gaseous components is passed into a separation zone; normally gaseous components are removed from the separation zone; normally liquid components are passed from the separation zone into a fractionation column; conversion products are removed from the upper portion of the fractionation column; a level of unconverted liquid is maintained in the lower portion of said fractionation column; and said unconverted liquid is returned to the conversion zone; a control system for maintaining the level of conversion of the fluid mixture at a level responsive to the availability of said gaseous reactant, which comprises:

a. first means to establish a first signal functionally representative of the temperature of the fluid mixture, said first signal operatively connected to control means for heat input to said fluid mixture;

b. second means to establish a second signal representing the temperature differential of fluid into and out of said conversion zone, said second signal operatively connected to said first means to reset said first signal in a manner sufficient to maintain said differential temperature at a hereinafter specified value;

c. third means comprising proportional-derivative control means for establishing a third signal representative of the rate of flow of said normally gaseous components leaving the separation zone;

d. fourth means for establishing a fourth signal representative of said liquid level in the lower portion of the fractionation column;

e. fifth means for establishing a fifth signal representative of the pressure within said conversion zone;

f. sixth means receiving said fourth and fifth signals and developing a sixth signal which is a function of said fifth signal when said pressure is below a predetermined level and which is a function of said fourth signal when said pressure is at least at said predetermined level; and, g. seventh means for summing said third and sixth signals, thereby producing a seventh signal representative of the desired specified value of said differential temperature, said seventh signal operatively connected to said second means to reset the second signal.

2. Control system of claim 1 wherein said fifth means is representative of the pressure of gaseous reactant being supplied to said hydrocarbon conversion process.

3. Control system of claim 1 wherein there is provided eighth means for withdrawing unconverted liquid from said conversion process, and said eighth means is operatively responsive to said fourth signal when said sixth signal is a function of said fifth signal.

4. Control system of claim 1 wherein said process comprises a hydrocarbon conversion process and said fluid mixture comprises hydrocarbon to be converted.

5. In a fluid mixture conversion process, wherein a fluid mixture, comprising gaseous reactant and a fluid to be converted, is introduced into a conversion zone maintained under conversion conditions; gaseous reactant is introduced into said process; conversion zone effluent containing normally liquid and normally gaseous components is passed into a separation zone; normally gaseous components are removed from the separation zone; normally liquid components are removed from the separation zone and passed into a fractionation column; conversion products are removed from the upper portion of the fractionation column; a level of unconverted liquid is maintained in the lower portion of the column; and said unconverted liquid is returned to the conversion zone; a control system for maintaining the level of conversion of the fluid mixture at a level responsive to the availability of said gaseous reactant, which comprises:

a. first means to establish a first signal functionally representative of the temperature of the fluid mixture, said first signal operatively connected to control means for heat input to said fluid mixture;

b. second means to establish a second signal representing the temperature differential of fluid into and out of said conversion zone, said second signal operatively connected to said first means to reset said first signal in a manner sufficient to maintain said differential temperature at a hereinafter specified value;

c. third means comprising proportional-derivative control means for establishing a third signal representative of the rate of flow of said gaseous reactant into said process;

d. fourth means for establishing a fourth signal representative of said liquid level in the lower portion of the fractionating column;

e. fifth means for establishing a fifth signal representative of the pressure within said conversion zone;

f. sixth means receiving said fourth and fifth signals and developing a sixth signal which is a function of said fifth signal when said pressure is below a predetermined level and which is a function of said fourth signal when said pressure is at least at said predetermined level; and, g. seventh means for summing said third and sixth signals thereby producing a seventh signal representative of the desired value of said differential temperature, said seventh signal operatively connected to said second means to reset the second signal.

6. Control system of claim 5 wherein said fifth means is representative of the pressure of said gaseous reactant passing into said hydrocarbon conversion process.

7. Control system of claim 5 wherein there is provided eighth means for withdrawing unconverted liquid from said conversion process, and said eighth means is operatively responsive to said fourth signal when said sixth signal is a function of said fifth signal.

8. Control system of claim 5 wherein said process comprises a hydrocarbon conversion process and said fluid mixture comprises hydrocarbon to be converted.

9. In a hydrocarbon conversion process wherein a hydrocarbon to be converted is admixed with a gaseous reactant and a hereinafter specified recycle hydrocarbon to produce a conversion zone feed mixture; said feed mixture is passed at conversion temperature through a first conduit into a conversion zone comprising a plurality of fixed catalyst beds in series; the effluent from each catalyst bed preceding the last bed is contacted with additional gaseous reactant being introduced through a second conduit associated with each bed succeeding the first catalyst bed; the conversion zone effluent is removed from the last catalyst bed and separated in a separation zone to provide at least a normally liquid hydrocarbon fraction and a normally gaseous product fraction; the normally gaseous product fraction is withdrawn from the separation zone via a third conduit; the normally liquid hydrocarbon fraction is withdrawn from the separation zone and passed into a fractionation column; converted hydrocarbon products are removed from the upper portion of the fractionation column; a level of unconverted hydrocarbon is maintained in the lower portion of the column; the unconverted hydrocarbon is returned to the conversion zone as said recycle hydrocarbon specified; and, makeup gaseous reactant is passed into the process via a fourth conduit; a control system for maintaining the level of hydrocarbon conversion at a level responsive to the availability of said gaseous reactant, which comprises:

a. first means to establish a first signal functionally representative of the temperature of the feed mixture, said first signal operatively connected to control means for heat input to said feed mixture;

b. second means to establish a second signal representing the temperature differential of fluid passing into and out of the first bed of said plurality of catalyst beds, said second signal operatively connected to said first means to reset said first signal in a manner sufficient to maintain the temperature differential across said first bed at a hereinafter specified value;

c. third means associated with each catalyst bed succeeding said first bed, to establish a third signal representing the temperature differential of fluids passing into and out of the associated succeeding catalyst bed in said plurality of beds, each third signal being operatively connected to fourth means hereinafter specified;

d. fourth means associated with each succeeding catalyst bed, controlling the rate of flow of additional gaseous reactant in the correspondingly associated second conduit, said fourth means being operatively responsive to the associated third signal in a manner sufficient to adjust said rate of flow to maintain the temperature differential across the associated succeeding catalyst bed at a hereinafter specified value;

e. fifth means comprising proportional-derivative control means to establish a fifth signal representative of the rate of flow of said makeup gaseous reactant;

f. sixth means for establishing a sixth signal representing said liquid level in the lower portion of the fractionating column;

g. seventh means for establishing a seventh signal representative of the pressure within said conversion zone;

h. eighth means receiving said sixth and seventh signals and developing an eighth signal which is a function of said seventh signal when said pressure is below a predetermined level and which is a function of said sixth signal when said pressure is at least at said predetermined level;

i. ninth means for summing said fifth and eighth signals, thereby producing a ninth signal representative of the desired specified value of each differential temperature; and, j. tenth means transmitting said ninth signal to said second means to reset said second signal, and to said third means to reset each third signal.

10. Control system of claim 9 wherein said seventh means is representative of the pressure of said makeup gas passing into said process.

11. Control system of claim 9 wherein there is provided eleventh means for withdrawing unconverted hydrocarbon from said hydrocarbon conversion process, and said eleventh means is operatively responsive to said sixth signal when said eighth signal is a function of said seventh signal.

12. In a hydrocarbon conversion process wherein a hydrocarbon to be converted is admixed with a gaseous reactant and a hereinafter specified recycle hydrocarbon to produce a conversion zone feed mixture; said feed mixture is passed at conversion temperature through a first conduit into a conversion zone comprising a plurality of fixed catalyst beds in series; the effluent from each catalyst bed preceding the last bed is contacted with additional gaseous reactant being introduced through a second conduit associated with each bed succeeding the first catalyst bed; the conversion zone effluent is removed from the last catalyst bed and separated in a separation zone to provide at least a normally liquid hydrocarbon fraction and a normally gaseous product fraction; the normally gaseous product fraction is withdrawn from the separation zone via a third conduit; the normally liquid hydrocarbon fraction is withdrawn from the separation zone and passed into a fractionation column; converted hydrocarbon products are removed from the upper portion of the fractionation column; a level of unconverted hydrocarbon is maintained in the lower portion of the column; the unconverted hydrocarbon is returned to the conversion zone as said recycle hydrocarbon specified; and, makeup gaseous reactant is passed into the process via a fourth conduit; a control system for maintaining the level of hydrocarbon conversion at a level responsive to the availability of said gaseous reactant, which comprises:

a. first means to establish a first signal functionally representative of the temperature of the feed mixture, said first signal operatively connected to control means for heat input to said feed mixture;

b. second means to establish a second signal representing the temperature differential of fluid passing into and out of the first bed of said plurality of catalyst beds, said second signal operatively connected to said first means to reset said first signal in a manner sufficient to maintain the temperature differential across said first bed at a hereinafter specified value;

c. third means associated with each catalyst bed succeeding said first bed, to establish a third signal representing the temperature differential of fluids passing into and out of the associated succeeding catalyst bed in said plurality of beds, each third signal being operatively connected to fourth means hereinafter specified;

d. fourth means associated with each succeeding catalyst bed, controlling the rate of flow of additional gaseous reactant in the correspondingly associated second conduit, said fourth means being operatively responsive to the associated third signal in a manner sufficient to adjust said rate of flow to maintain the temperature differential across the associated succeeding catalyst bed at a hereinafter specified value;

e. fifth means comprising proportional-derivative control means to establish a fifth signal representative of the rate of flow of said normally gaseous product fraction;

f. sixth means for establishing a sixth signal representing said liquid level in the lower portion of the fractionating column;

g. seventh means for establishing a seventh signal representative of the pressure within said conversion zone;

h. eight means receiving said sixth and seventh signals and developing an eighth signal which is a function of said seventh signal when said pressure is below a predetermined level and which is a function of said sixth signal when said pressure is at least at said predetermined level;

i. ninth means for summing said fifth and eighth signals, thereby producing a ninth signal representative of the desired specified value of each differential temperature; and, j. tenth means transmitting said ninth signal to said second means to reset said second signal, and to said third means to reset each third signal.

13. Control system of claim 12 wherein said seventh means is representative of the pressure of said makeup gas passing into said process.

14. Control system of claim 12 wherein there is provided eleventh means for withdrawing unconverted hydrocarbon from said hydrocarbon conversion process, and said eleventh means is operatively responsive to said sixth signal when said eighth signal is a function of said seventh signal.